United States Patent
Khalaf et al.

(10) Patent No.: US 11,942,974 B2
(45) Date of Patent: Mar. 26, 2024

(54) MILLIMETER WAVE RADIO CALIBRATION CIRCUIT

(71) Applicant: PHARROWTECH BV, Leuven (BE)

(72) Inventors: Khaled Khalaf, Aarschot (BE); Ahmet Tekin, Leuven (BE); Biagio Bisanti, Antibes (FR); Qixian Shi, Kessel Lo (BE); Eric Duvivier, Biot (FR)

(73) Assignee: Pharrowtech BV, Leuven (BE)

( * ) Notice: Subject to any disclaimer, the term of this patent is extended or adjusted under 35 U.S.C. 154(b) by 0 days.

(21) Appl. No.: 17/814,117

(22) Filed: Jul. 21, 2022

(65) Prior Publication Data

US 2023/0336197 A1  Oct. 19, 2023

Related U.S. Application Data

(60) Provisional application No. 63/203,396, filed on Jul. 21, 2021.

(51) Int. Cl.
*H04B 1/04* (2006.01)
*H04L 27/36* (2006.01)
*H04L 27/38* (2006.01)

(52) U.S. Cl.
CPC ......... *H04B 1/0475* (2013.01); *H04L 27/364* (2013.01); *H04L 27/3863* (2013.01)

(58) Field of Classification Search
CPC ..... H04B 1/0475; H04L 27/26; H04L 27/364; H04L 27/3863
USPC ........................................ 375/219, 220, 262
See application file for complete search history.

(56) References Cited

U.S. PATENT DOCUMENTS

| 2004/0208635 | A1* | 10/2004 | Sinsky | H04B 10/5057 |
| | | | | 398/183 |
| 2008/0139139 | A1* | 6/2008 | Pan | H04B 1/525 |
| | | | | 455/114.2 |
| 2008/0317165 | A1* | 12/2008 | Bagheri | H04B 17/101 |
| | | | | 375/296 |

(Continued)

FOREIGN PATENT DOCUMENTS

EP  2372902 B1 *  4/2015 ............. H03B 28/00

*Primary Examiner* — Emmanuel Bayard
(74) *Attorney, Agent, or Firm* — Garlick & Markison; Kelly H. Hale

(57) ABSTRACT

A method for calibrating a radio transceiver begins by injecting a low-frequency tone at a transmit power amplifier input of the radio transceiver, where the low frequency tone is at least an order of magnitude lower than the operating frequency of a local oscillator coupled to the transmitter input. The method continues by upconverting the low-frequency tone to produce a plurality of tones at a transmit power amplifier output and then determining which tone of the plurality of tones is a local oscillator feedthrough tone associated with a transmit power amplifier output and which tone of the plurality of tones is representative of an in-phase and quadrature (I/Q) imbalance associated with the transmit power amplifier output. The method continues by determining a DC offset, based on the local oscillator feedthrough tone, where the DC offset is representative of local oscillator feedthrough in the transmit power amplifier output and finally determining, based on the tone representative of an I/Q imbalance, an I/Q offset associated with the transmit power amplifier output.

20 Claims, 15 Drawing Sheets

(56) References Cited

U.S. PATENT DOCUMENTS

| | | | |
|---|---|---|---|
| 2014/0355655 A1* | 12/2014 | Chakraborty | H04B 1/40 375/219 |
| 2015/0155898 A1* | 6/2015 | Pinagapany | H04B 17/0085 375/350 |
| 2016/0218406 A1* | 7/2016 | Sanford | H01P 3/127 |
| 2017/0019235 A1* | 1/2017 | Brannon | H04L 25/025 |
| 2017/0212214 A1* | 7/2017 | Murali | G01S 7/4021 |
| 2021/0314072 A1* | 10/2021 | Rozenblit | H04B 15/06 |
| 2022/0321105 A1* | 10/2022 | AbdelHafez | H03H 7/0153 |

* cited by examiner

MILLIMETER WAVE RADIO CALIBRATION CIRCUIT

CROSS REFERENCE TO RELATED APPLICATIONS

The present U.S. Utility Patent Application claims priority pursuant to 35 U.S.C. § 119(e) to U.S. Provisional Application No. 63/203,396, entitled "MILLIMETER WAVE RADIO TEST CIRCUIT", filed Jul. 21, 2021, which is hereby incorporated herein by reference in its entirety and made part of the present U.S. Utility Patent Application for all purposes.

BACKGROUND OF THE INVENTION

Technical Field of the Invention

This invention relates generally to wireless technology and more particularly to millimeter wave (mmwave) radio technology.

Description of Related Art

Data communication involves sending data from one device to another device via a communication medium (e.g., a wire, a trace, a twisted pair, a coaxial cable, air, etc.). The devices range from dies within an integrated circuit (IC), to ICs on a printed circuit board (PCB), to PCBs within a computer, to computers, to networks of computers, and so on.

Data is communicated via a wired and/or a wireless connection in accordance with a data communication protocol. Data communication protocols dictate how the data is to be formatted, encoded/decoded, transmitted, and received. For some data communications, digital data is modulated with an analog carrier signal and transmitted/received via a modulated radio frequency (RF) signal.

Wireless technologies based on relatively high radio frequencies have proven capable of delivering data transmissions in the range of multi-gigabits/second with relatively lower latency. In general, multi-gigabit/second communication speeds require relatively wide transmission bandwidths, which are available with high carrier frequency radio systems, such as frequencies in the millimeter wave (mmwave) range (i.e., 30-300 GHz). For example, a wireless data communication protocol such as IEEE 802.11ay dictates how wireless communications are to be done between local and metropolitan area networks, including defining multiple channels from 57 GHz to 71 GHz that provide, for example, potential coded data rates up to 35.4 Gbps when four channels are bonded together.

Radio systems designed for use in the mmwave range benefit from high levels of integration, allowing for manufacturing efficiencies that can lead to lower cost, shorter manufacturing periods and higher performance. As is further known, millimeter-wave radio systems necessarily require testing and/or calibration in order to meet expected performance requirements.

BRIEF DESCRIPTION OF THE SEVERAL VIEWS OF THE DRAWING(S)

FIG. 1 provides a schematic block diagram of an example radio transmit/receive (TRX) front end in accordance with the present invention;

FIG. 2 is a logic diagram of an example of a method for utilizing a DC supply source to implement a testing loop back for a radio front end in accordance with the present invention in accordance with the present invention;

FIG. 3 provides a schematic block diagram of an example of a radio transmit/receive (TRX) front end with a low noise amplifier (LNA) switch between the transmission (TX) and receive (RX) paths of a radio in accordance with the present invention;

FIG. 4 provides a schematic block diagram of mechanism for calibrating local oscillator feed-through (LOFT) and image rejection signals in a millimeter wave (mmwave) radio implementation in accordance with the present invention;

FIG. 5 provides schematic block diagram of a system for calibrating of LOFT and image rejection signals in a millimeter wave (mm wave) radio implementation in accordance with the present invention;

FIG. 6 illustrates a method for calibrating local oscillator feed-through (LOFT) and image rejection signal calibration in accordance with the present invention;

FIG. 7A provides schematic block diagram of a system for calibrating of LOFT rejection signals in a millimeter wave (mm wave) radio implementation in accordance with the present invention;

FIG. 7B illustrates a method for inserting a low frequency tone for calibrating LO feedthrough in a transceiver in accordance with the present invention;

FIG. 8A provides a schematic block diagram of a system for calibrating of I/Q balance image rejection signals in a millimeter wave (mm wave) radio implementation in accordance with the present invention;

FIG. 8B illustrates a method for inserting a low frequency tone for calibrating IQ imbalance in a transceiver in accordance with the present invention;

FIG. 9A provides a schematic block diagram of a system for calibrating of I/Q balance image rejection signals in a millimeter wave (mm wave) radio implementation in accordance with the present invention;

Figure 11:
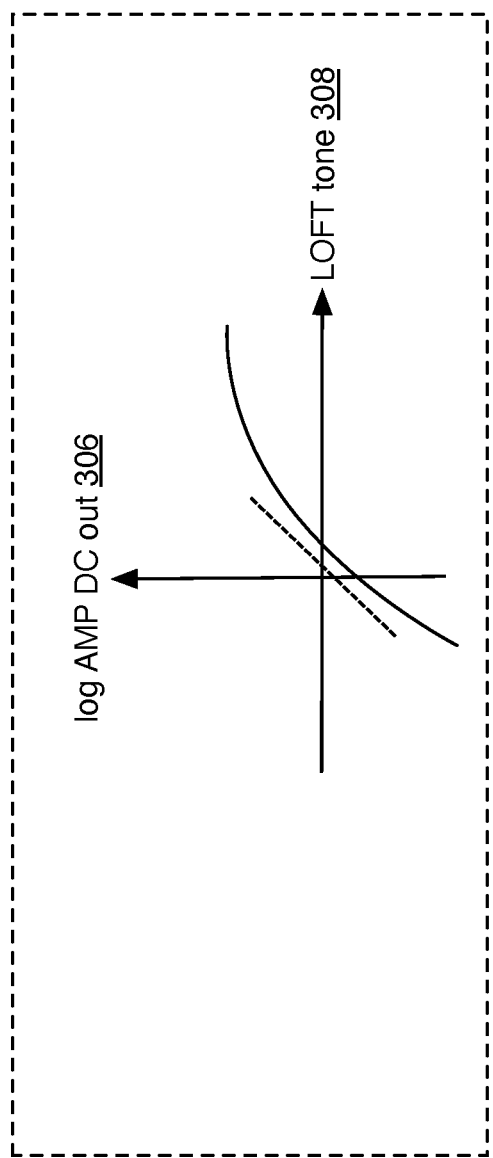
Figure 12:
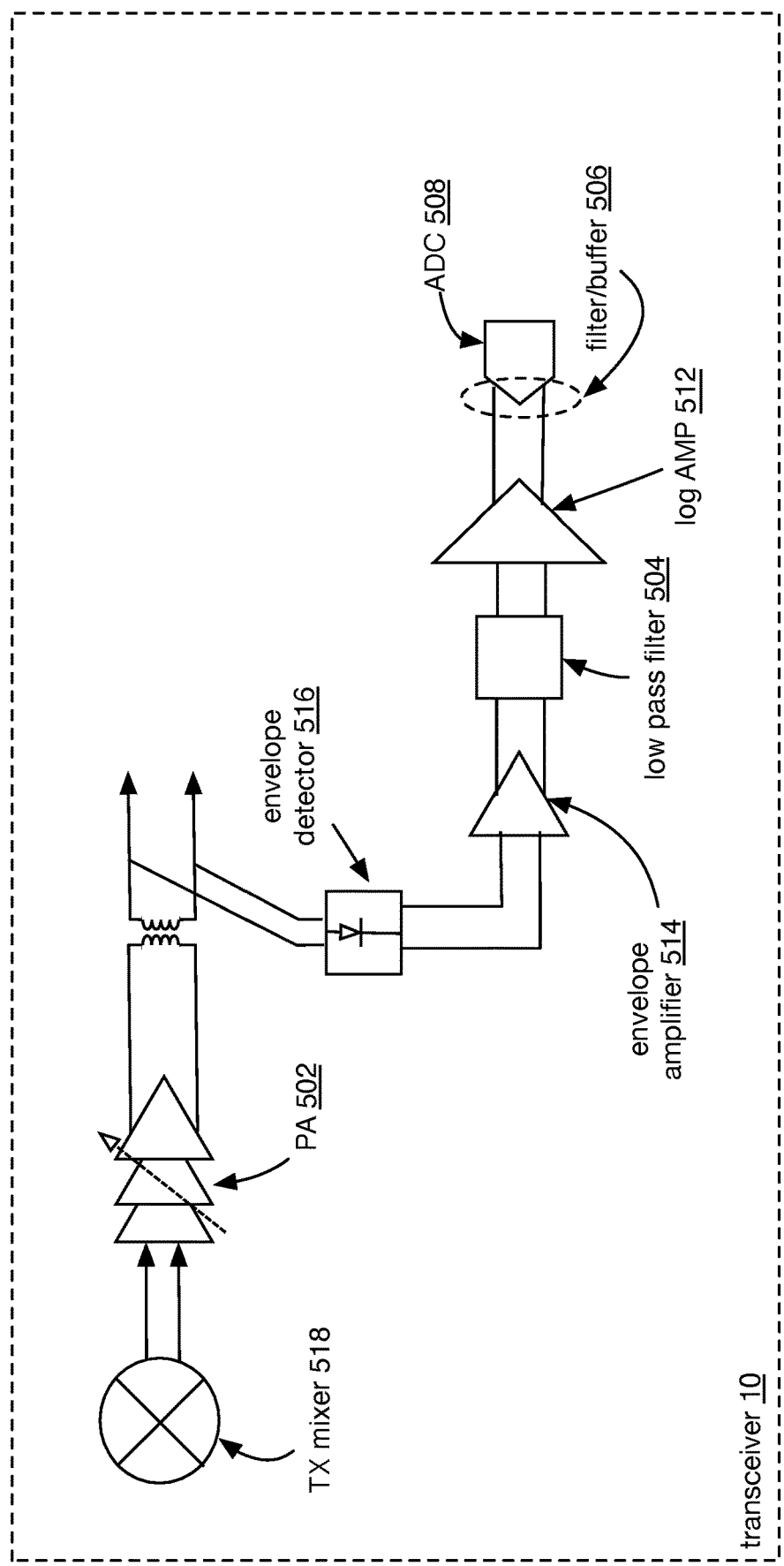
Figure 13:
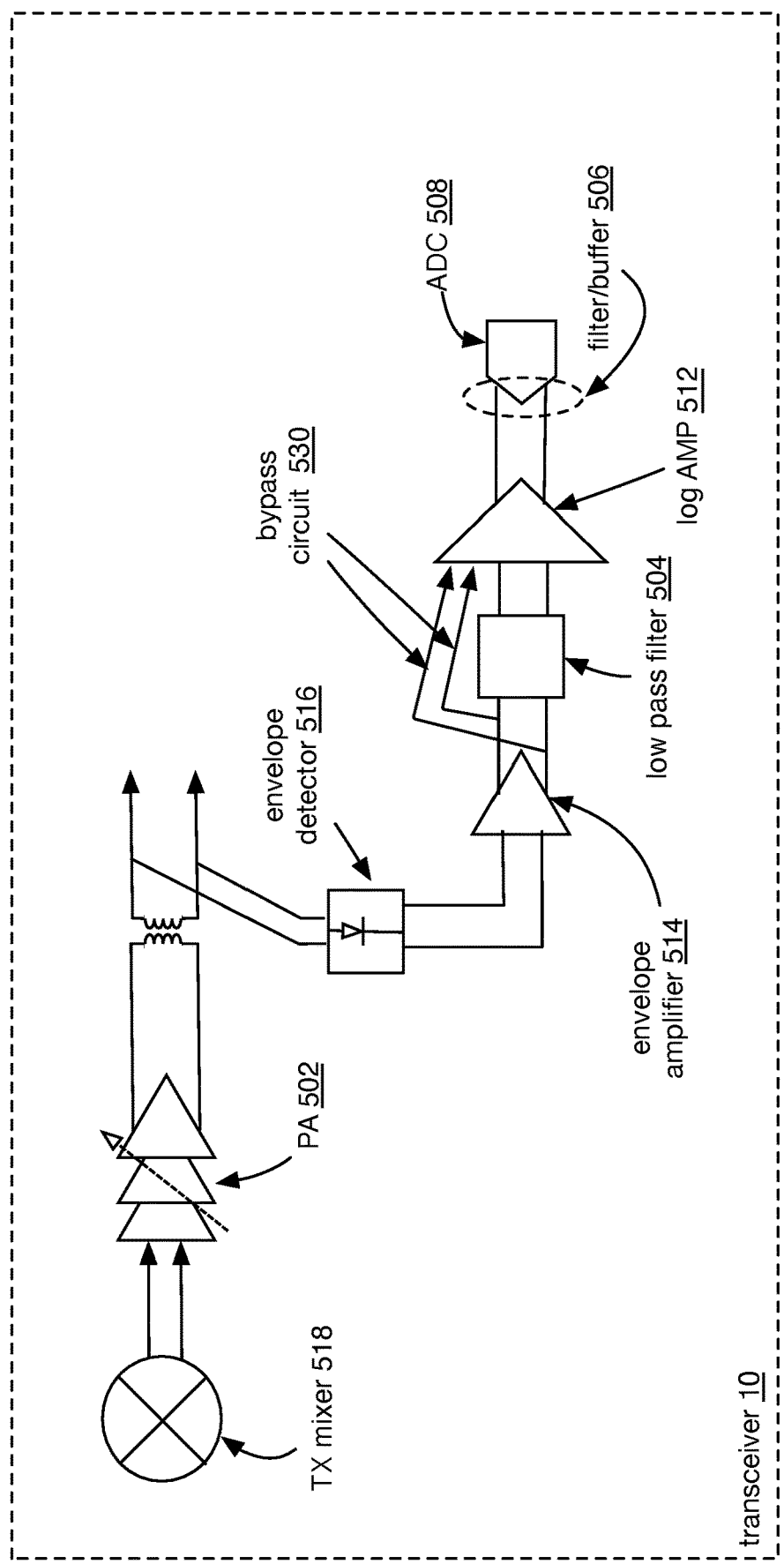

FIG. 11 provides a representation of results from using a log amplifier for LO feedthrough amplitude resolution in accordance with the present invention;

FIG. 12 provides a schematic block diagram of a radio transceiver with a calibration structure in accordance with the present invention; and FIG. 13 is a schematic representation of a calibration architecture incorporating a by-pass circuit in accordance with the present invention.

DETAILED DESCRIPTION OF THE INVENTION

Figure 1:
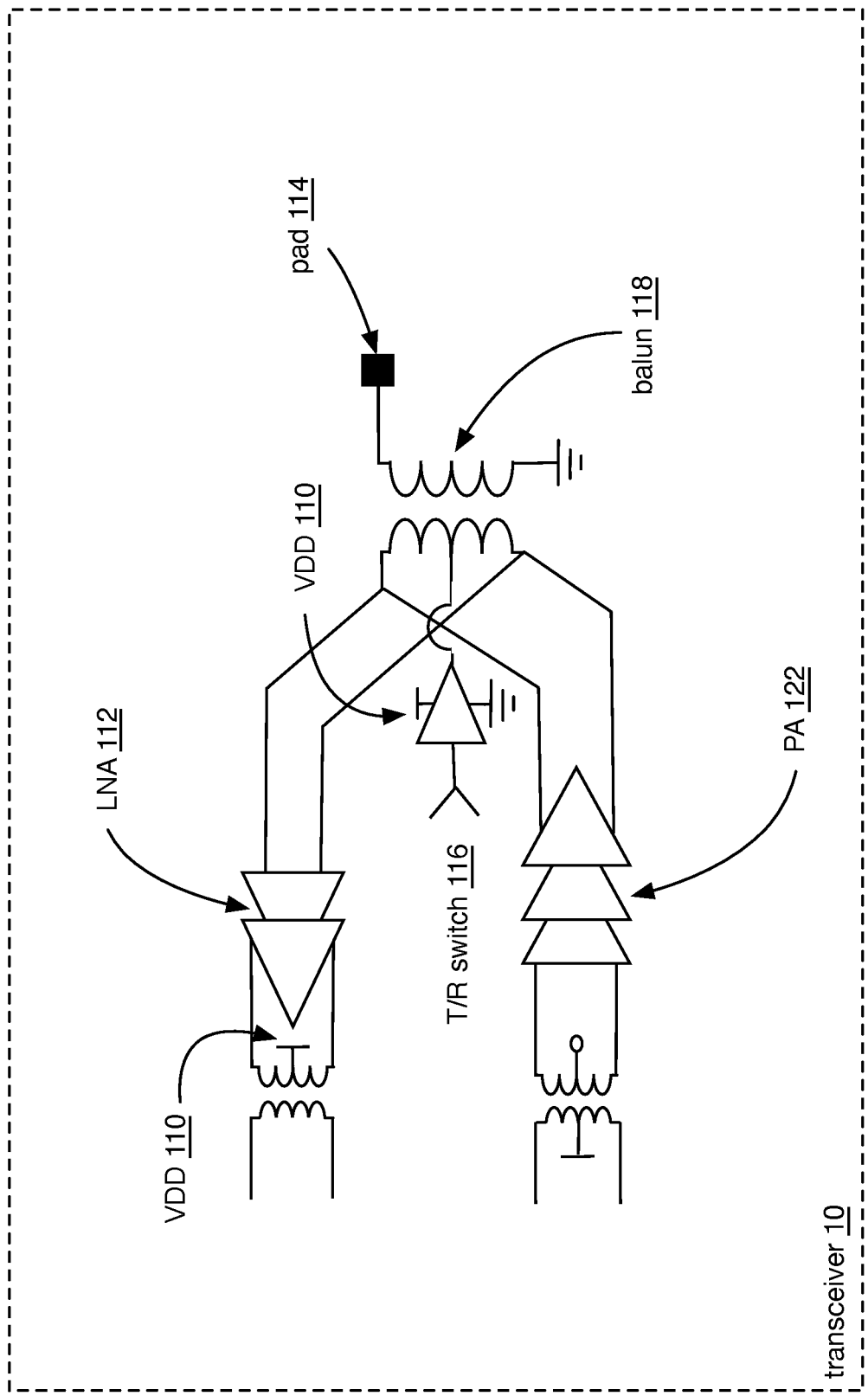

FIG. 1 provides a schematic block diagram example of a radio transmit/receive (TRX) (transceiver) front end 10 adapted to share an antenna or antenna array between the transmission (TX) and receive (RX) paths of a transceiver. In the example, a power amplifier (PA) 122 and a low-noise amplifier (LNA) 112 are coupled share a common balanced to unbalanced (balun) transformer 118. In an example, the LNA 112 is based on a common gate design to provide high impedance when in an off state. In another example, the PA 122 and LNA 112 are adapted to have similar on-impedance, such that a common balun 118 can be used for matching. In yet another example, a DC supply switch 116 is coupled to an additional winding in the balun.

In an example, the system of FIG. 1 can be described as a substantially switchless transmit/receive (TRX) front end, since the system does not incorporate a lossy element in the transmission (TX) and receive (RX) paths of the radio front end.

Figure 2:
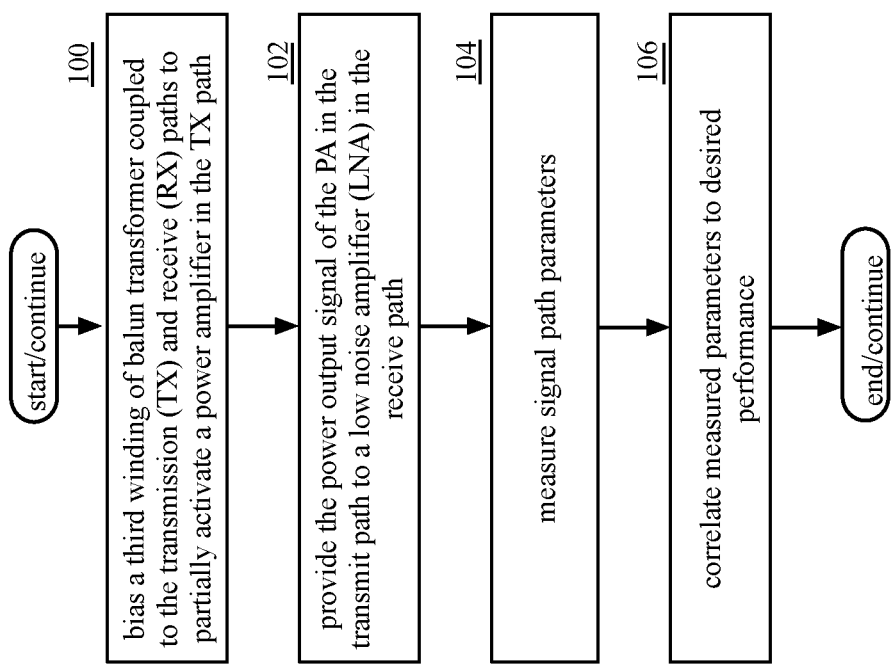

FIG. 2 is a logic diagram of an example of a method for utilizing a DC supply source to implement a test loop back for a radio front end. In practice, using the method of FIG. 2, defective parts of a radio system can be identified prior to delivery to customers. For example, millimeter wave (mm-wave) loop back testing can be executed at the wafer or packaged die scale to screen for bad devices prior to assembly on application and/or product printed circuit boards (PCBs) or even on an application or product board and/or in an original equipment manufactured (OEM) product. Advantages of loop back testing include simplification of test equipment setup (leading to lower test-cost per unit of time), potentially resulting in lower production costs at the device level, which in turn provides for higher margins and/or lower average selling price (ASP) to direct customers.

The method begins at step 100, with a DC supply being used to bias the third winding of a balanced to unbalanced (balun) transformer coupling the power amplifier (PA) and a low-noise amplifier (LNA) in a radio transmit/receive (TRX) front end, such as the TRX front end illustrated in FIG. 1. In an example, the primary winding forms the input to the balun and a secondary winding forms the output of the balun. In a specific example, the third winding of the balun can be an additional point of a two winding balun or a true tap in the middle winding of the balun. For example, the voltage from the neutral to the center point will equal the voltage from the center point to end of the coil for a center tap balun. In an alternative example, the third winding can be a winding separate from the primary and secondary windings. The method continues at step 102, where the resultant power output signal of the PA is provided to the input of the LNA. At step 104, the parameters of the signal path, such as power output at a particular frequency are measured. At step 106 the measured parameters are compared to desired performance of the signal path elements.

In an example, the loop back testing method of FIG. 2 can be used to validate the entire front end signal path (with the possible exception of the power amplifier (PA)) without a degradation of radio frequency (RF) performance that can be common with other test methods. In an example, the third winding can comprise a weakly-coupled winding below the balun to couple the input signal in receive (RX) mode to the low noise amplifier (LNA) gates to boost its gain, thereby providing a lower total RX noise figure for the front end. In a specific example, the third winding can be implemented to provide half of the DC supply voltage to the LNA. In another specific example, the third winding can be implemented to provide almost any predetermined fractional voltage for the loop back test. In practice, a loop back test using a fractional voltage will have the disadvantage of testing the LNA in different operating conditions than the PA testing, however this disadvantage can be mitigated somewhat by using a comparative mechanism, such as a look up table, or by extrapolating the measured LNA measurements to a non-fractional operating voltage.

In a specific example of implementation and operation, a method for testing a radio front-end comprises biasing a balun at a third winding, where a transmit power amplifier and a low noise amplifier are coupled to a secondary winding of the balun and the biasing causes the transmit power amplifier in a transmit path to partially activate to produce a power amplifier output. The method continues, by providing the power amplifier output to the low noise amplifier and measuring one or more signal path parameters of the radio front-end to produce one or more test results. The method continuers, by correlating the one or more test results to one or more predetermined test values; and in response to the correlating, determining whether the test results are favorable. In a specific example, the method includes activating a transmit/receive switch to bias the balun, where the transmit/receive switch is integrated on the radio front-end. In an example, a power amplifier, low-noise amplifier, transmit/receive switch and balun are integrated on a common integrated circuit.

In another specific example of implementation and operation, method for testing a radio front-end comprises biasing a balun at a third winding, where a transmit power amplifier and a low noise amplifier are coupled to a secondary winding of the balun and where the biasing causes the transmit power amplifier in the TX path to partially activate to produce a power amplifier output. The method continues by providing the power amplifier output to the low noise amplifier, and measuring one or more signal path parameters of the radio front-end to produce one or more test results. The method then continues by correlating the one or more test results to one or more predetermined test values to produce correlated test values and based on the correlated test values, determining whether the test results are favorable. In a specific related example, the method includes activating a transmit/receive switch to bias the balun, where the transmit/receive switch is integrated on the radio front-end. In another specific related example, the power amplifier, the low-noise amplifier, the transmit/receive switch and the balun are integrated on a common integrated circuit.

Figure 3:
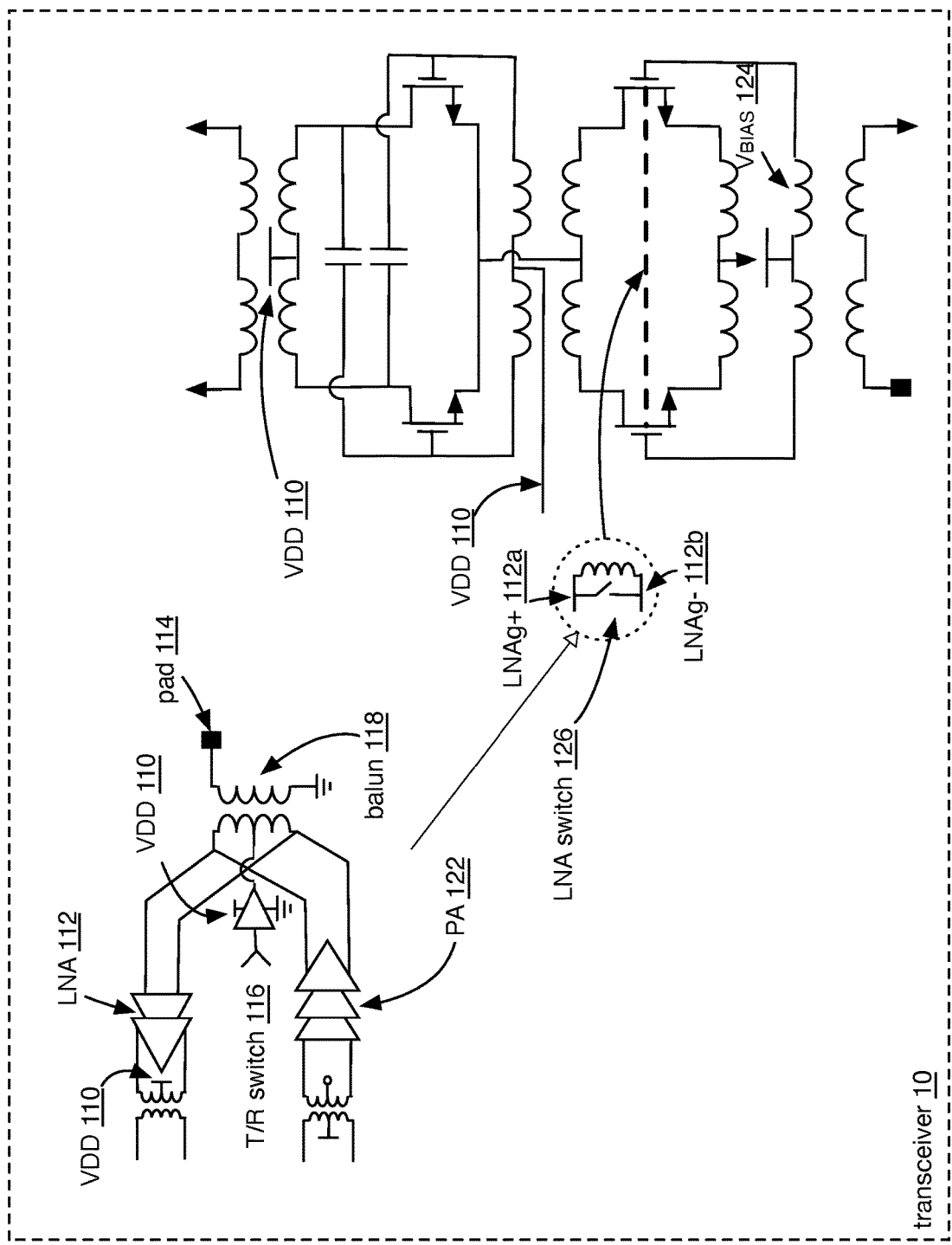

FIG. 3 provides a schematic block diagram an example transmission (TX) and receive (RX) paths of a transceiver 10. In an example, a switchless transmit/receive (TRX) front end can be useful for switching between TX/RX modes, an LNA can comprise one or more input transistors that will degrade and/or be permanently damaged when the TRX front end is in transmit mode, due to the relatively high power from the PA. In an example, the degradation can increase when the circuit results in positive feedback to the input transistor gate(s). In an example, provisioning the TRX front end 10 with an LNA switch 126 (between LNA 112*a* & LNA 112*b*) adapted to short the LNA gate(s) 112*a* or 112*b* to ground when the TRX front end 10 is in TX mode can reduce or eliminate degradation to an LNA input transistor and the subsequent reliability thereof.

In an example, local oscillator feed-through (LOFT) and image rejection signals can be found in the transmit (TX) signal for a radio. The LOFT and/or image rejection signals can be removed and/or attenuated using an ADC, to convert the TX signal to digital for processing in the digital domain (using, for example, a fast Fourier transform function (FFT)), however, the ADC and processing consume power and can introduce latency to the TX signal. For example, an ADC can be implemented as a successive-approximation-register (SAR). In a related example, the SAR ADC mentioned is configured for low frequency conversion and can be used as a house-keeping ADC (HKADC) (sometimes referred to as an auxiliary ADC). In a specific example, a signal path ADC can be differentiated from a traditional SAR, due to, for example, due to its relatively high sample rate requirement(s).

Figure 4:
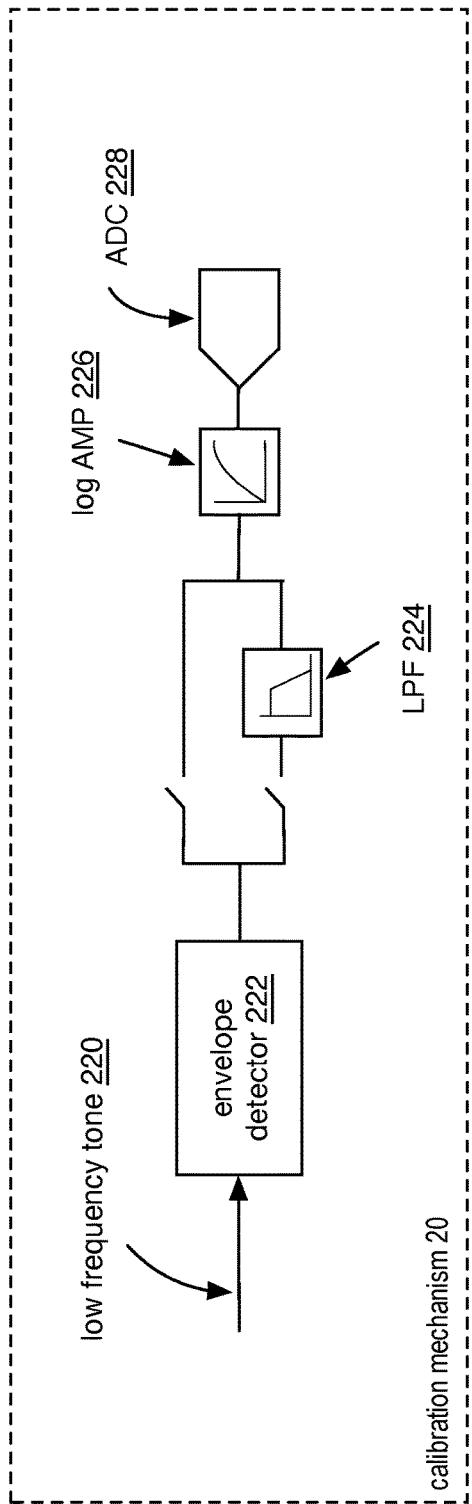

FIG. 4 provides a schematic block diagram of a mechanism for calibrating LOFT and image rejection signals in a millimeter wave (mmwave) radio implementation. In the example, an envelope detector 222 is used with a low pass filter (LPF) 224 followed by a Log amplifier (log Amp) 226 circuit to isolate and attenuate low frequency feedthrough (LOFT), allowing an associated intermodulation (IM) signal to be measured using a low frequency, low power ADC such as a successive-approximation-register (SAR) ADC or a dual-slope ADC and calibrated out of the TX signal.

Figure 5:
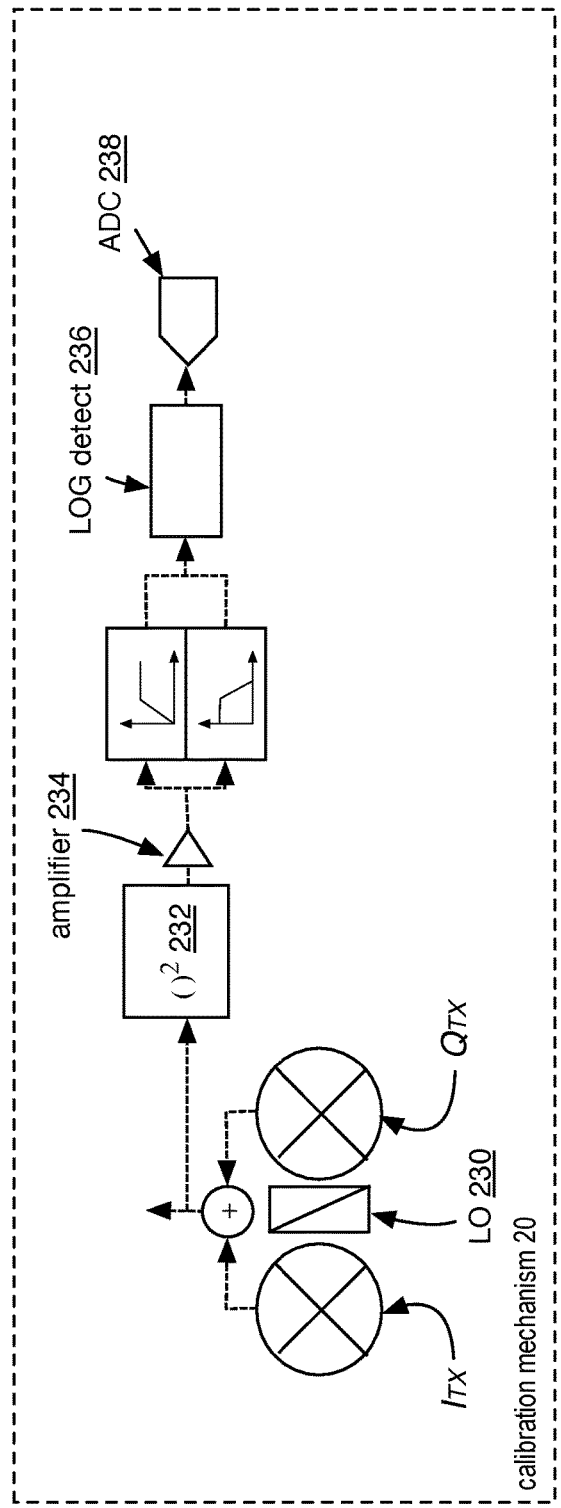

FIG. 5 provides schematic block diagram of a system for calibrating of LOFT and image rejection signals in a millimeter wave (mm wave) radio implementation.

Figure 6:
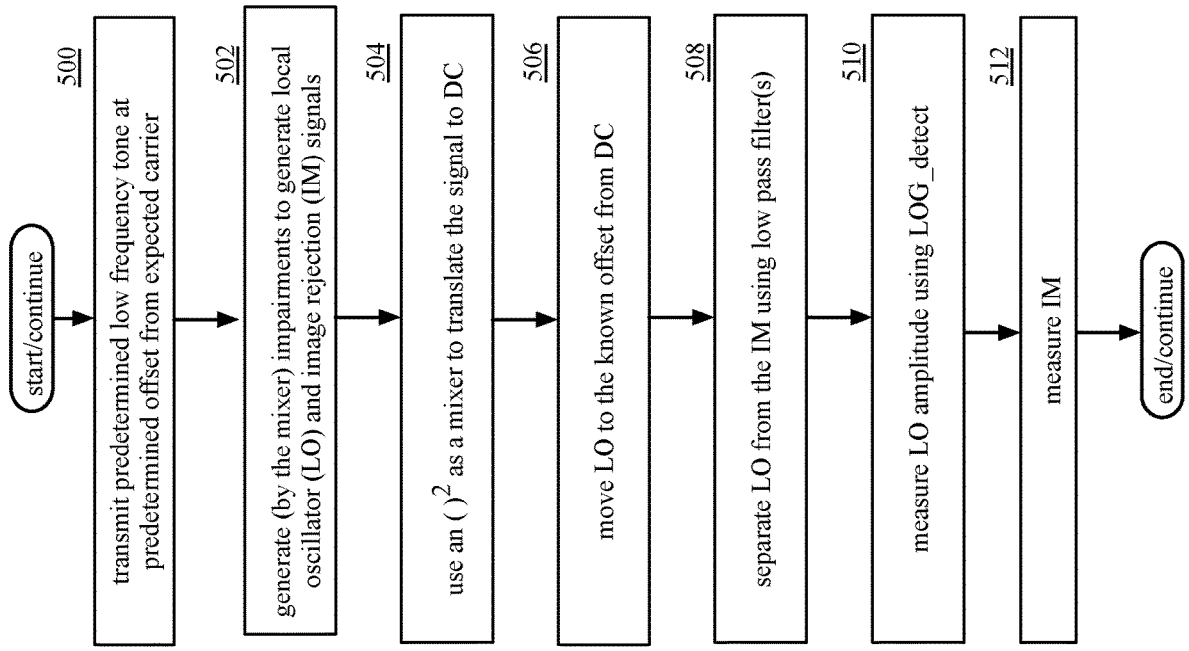

FIG. 6 illustrates a method for calibrating local oscillator feed-through (LOFT) and image rejection signal calibration. The method begins at step 600 by transmitting a pure tone at a fixed offset from the carrier, where both the pure tone and the fixed offset are predetermined. At step 602, the method continues with the generation of local oscillator (LO) and IM signals due to any impairments in the mixer. At step 604 the $(\ )^2$ functions as a mixer to migrate the signal to DC, then, at step 606, the LO is moved to the predetermined offset from DC and the IM is moved to 2× of the known offset from DC. At step 608 the LO is separated from the IM with one or more low-pass filters and at step 610 the amplitude of the LO is measured using the log Det. Finally, at step 612, the IM can be measured. In an alternate example referring to FIG. 4, a pass through path from the Envelope Detect to LogAmp can be replaced by a high pass filter (HPF) to further improve the LO-feedthrough and image suppression capability of the calibration system illustrated.

In a quadrature-based RF transceiver, a local oscillator (LO) can leak to the output of the receiver, producing LO feedthrough. In an example, DC offset is multiplied with the local oscillator (LO) signal and can be a dominant contributor to LO Feedthrough "leakage". Whereas leakage can be the result of capacitive coupling to the output, etc., in an example, DC offset can derive from a baseband signal being multiplied by LO coupling to the output. Additionally, quadrature-based RF transceiver with in-phase and quadrature (I/Q) components are known to exhibit imbalance (I/Q imbalance) between the two 90-degree quadrature signals, caused by, for example, non-ideal mixers, amplifier offsets and frequency error between transmit and receive channels, etc. An amount of I/Q imbalance can be represented as I/Q Offset (also called I/Q origin offset), where the I/Q offset indicates the magnitude of a carrier feedthrough signal. Additionally, uncalibrated I/Q gain/offset can result in undesired sideband emissions in an associated transmitter. In most cases the response for a given transceiver can be calibrated so that I/Q components will have substantially the same gain/offset.

In an example, calibration can be accomplished in the digital domain using an analog to digital converter (ADC). In another example, calibration can be done using readily available measuring equipment, such as an oscilloscope. In a specific example of implementation and operation, an envelope detector can be configured to measure the power output of a transceiver. In an example, the envelope detector can be used initially to measure a signal envelope at each of a plurality of power levels.

Figure 7A:
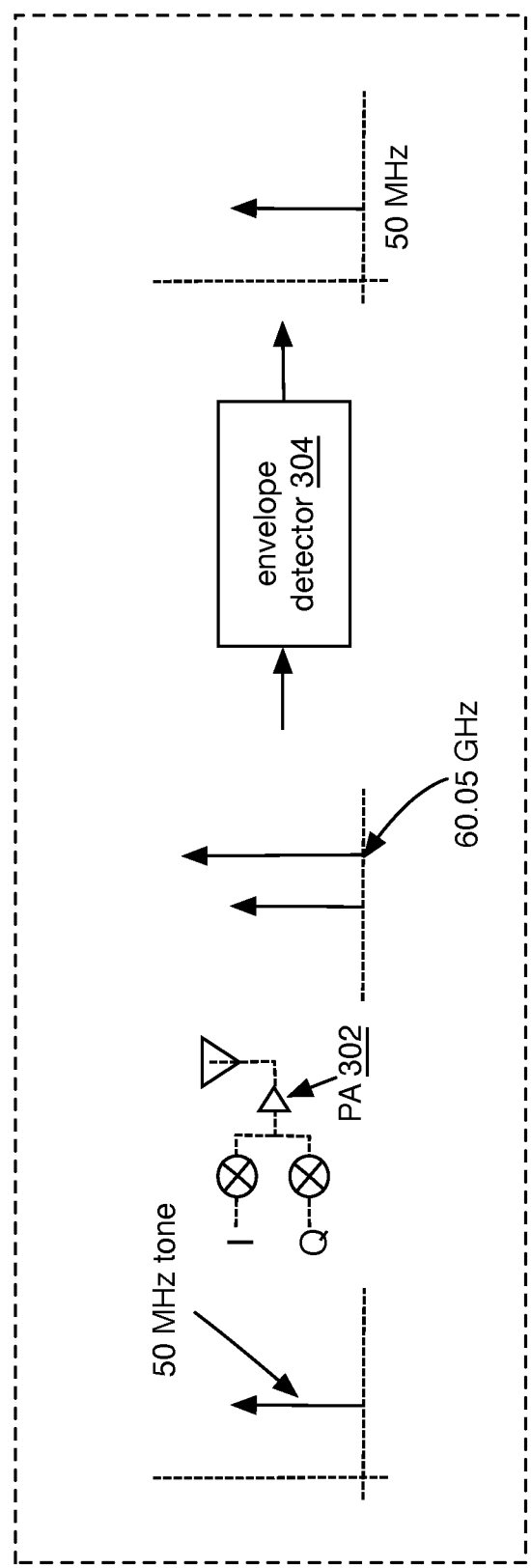

FIG. 7A provides schematic block diagram of a system for calibrating of LOFT rejection signals in a millimeter wave (mm wave) radio implementation.

Figure 7B:
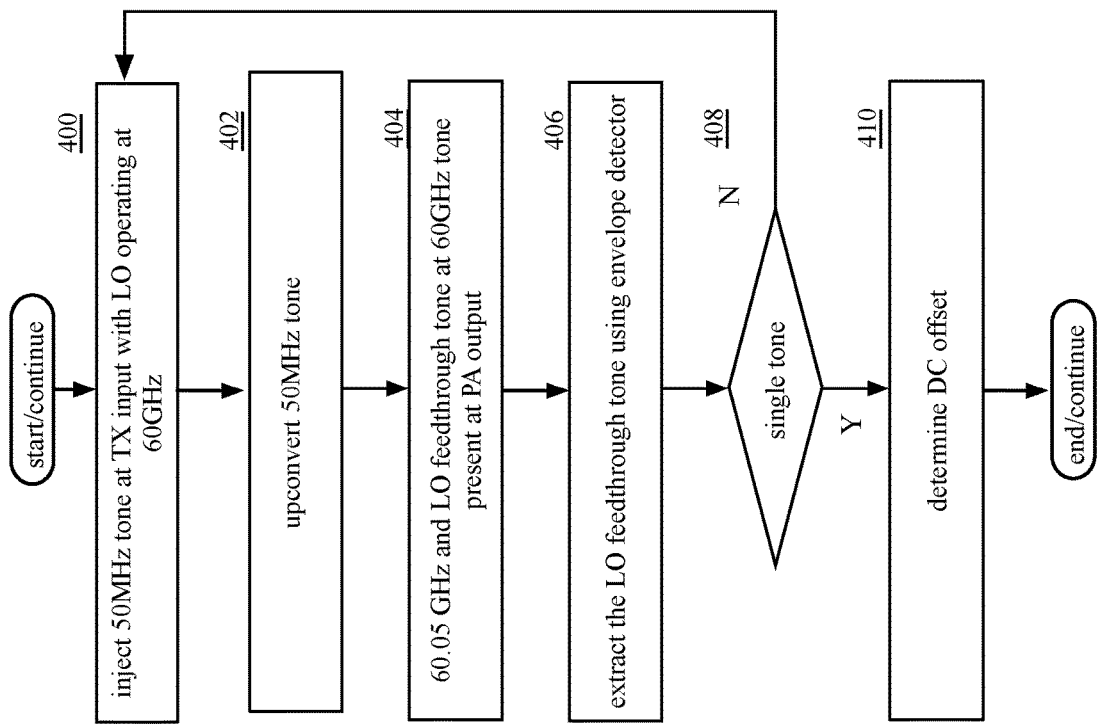

FIG. 7B illustrates a method for inserting a low frequency tone for calibrating LO feedthrough in a transceiver. At step 400 a 50 MHz tone is inserted with an LO operating at 60 GHz. At step 402, the 50 MHz tone is upconverted and at step 404 the 60.05 GHz tone presents at the output of the power amplifier and the insertion of the 50 MHz tone will likewise result in an LO feedthrough tone at 60 GHz. In an example, in the time-domain the output of an example transceiver will be modulated with a 50 MHz sine wave, enabling an envelope detector at step 406 to extract the LO feedthrough tone. At step 408, if only one tone is measured at the input of the envelope detector the output will be representative of DC offset. At step 410 DC offset is determined based on the single tone.

Figure 8A:
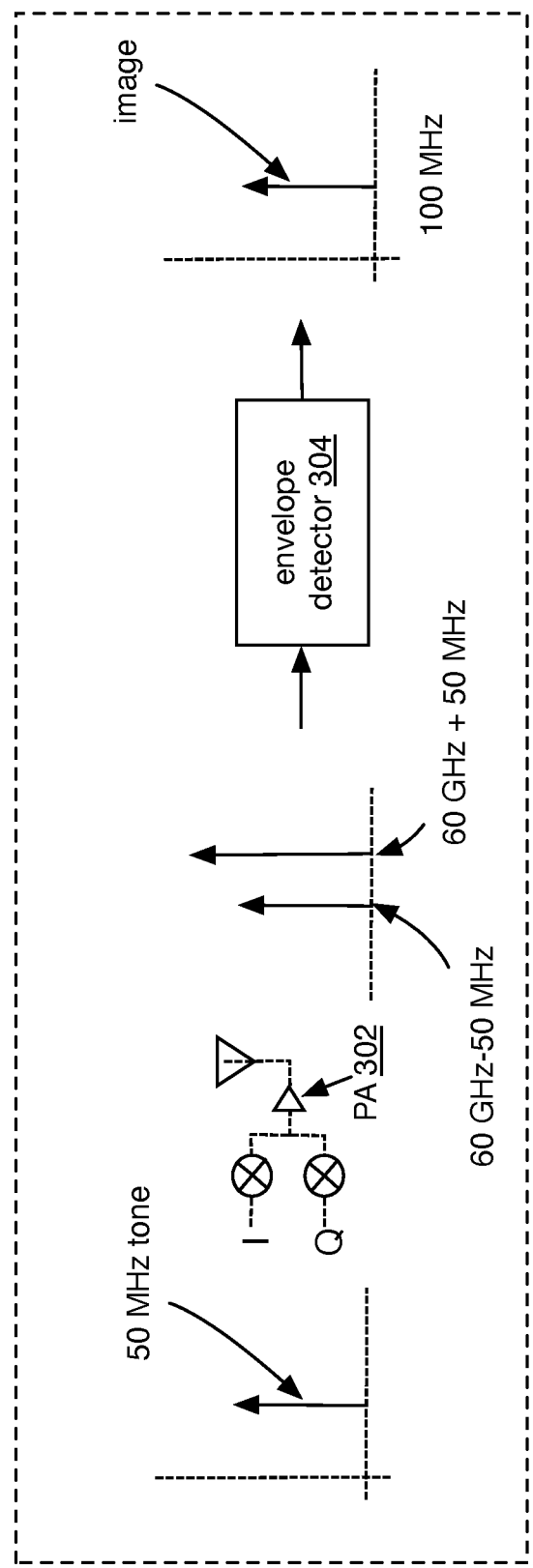

FIG. 8A provides a schematic block diagram of a system for calibrating of I/Q balance image rejection signals in a millimeter wave (mm wave) radio implementation.

Figure 8B:
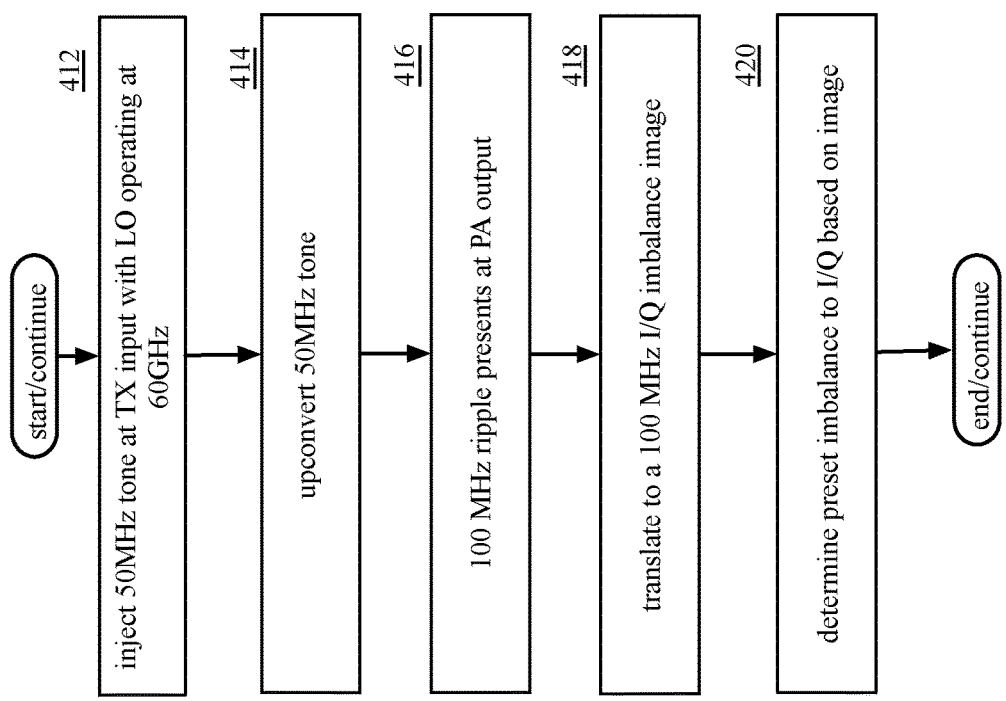

FIG. 8B illustrates a method for inserting a low frequency tone for calibrating IQ imbalance in a transceiver. In an example, calibration can require determining what side (negative or positive) to imbalance and by how much (i.e. amplitude). In an example, the DC offset can be modified based on the power level of the representative tone measured by the envelope detector to produce an imbalance offset. In a related example, a resultant attenuation or amplification will be an indicator of the correct (or incorrect) imbalance offset, enabling the imbalance to be corrected by adjusting the gain of the I or the Q as appropriate. At step 412 a 50 MHz tone is inserted with an LO operating at 60 GHz. At step 414, the 50 MHz tone is upconverted. At step 416, a 100 MHz "ripple" presents at the PA output. At step 418 the 100 MHz ripple is translated to a 100 MHz I/Q imbalance "image" at the envelope detector and at step 420 a preset to I/Q is determined based on the image.

Figure 9A:
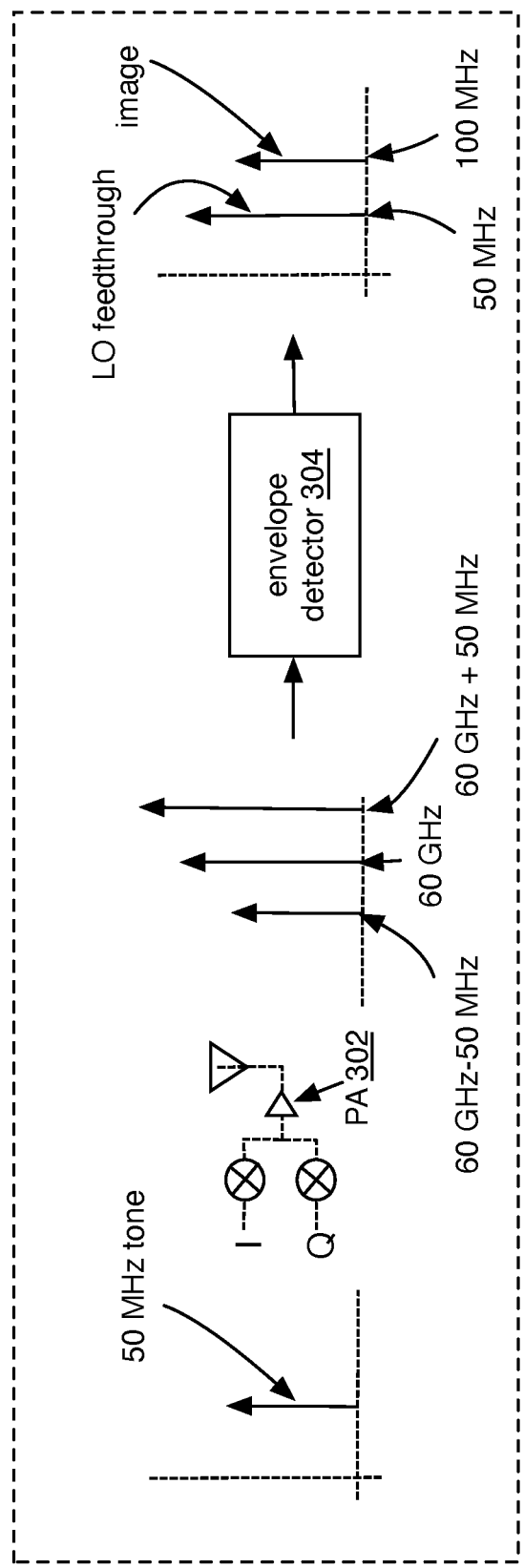
FIG. 9B illustrates a method for detecting LO feedthrough and determining I/Q imbalance in accordance with the present invention.

FIG. 9A provides a schematic block diagram of a system for calibrating of I/Q balance image rejection signals in a millimeter wave (mm wave) radio implementation.

Figure 9B:
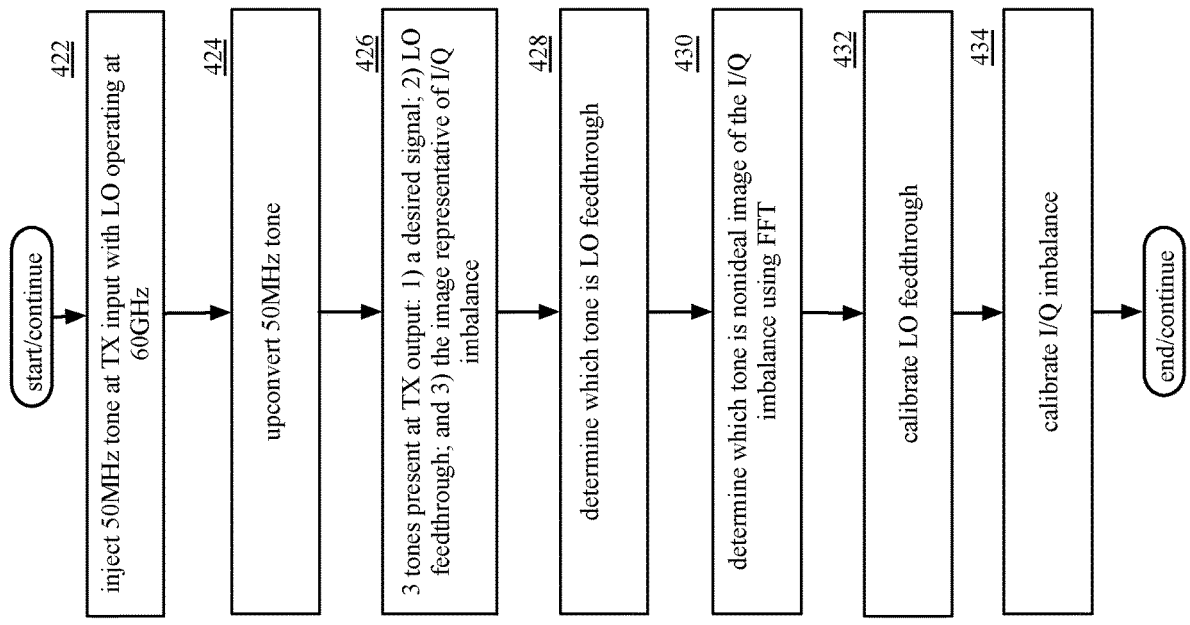

FIG. 9B illustrates a method for detecting LO feedthrough and determining I/Q imbalance. In a specific example of implementation and operation, a given transceiver can exhibit both LO feedthrough and I/Q imbalance simultaneously. At step 422, a 50 MHz tone is injected at the transmit (TX) input and upconverted at step 424, resulting, at step 426, in 3 tones at the TX output: 1) a desired signal; 2) LO feedthrough; and 3) the image representative of I/Q imbalance. In an example, the TX output will result in a 50 MHz ripple and a 100 MHz ripple in the time domain. In a further example, translating the TX output can enable the 50 MHz ripple and a 100 MHz ripple to be determined in either of the time domain, for example using an oscilloscope, or in the frequency domain, for example after performing a Fast-Fourier transform (FFT) in the digital domain. At step 428 a FFT is used to provide an indication of which of the 50 MHz ripple and a 100 MHz ripple is the LO feedthrough tone and which is the nonideal image of the I/Q imbalance at step 430. In an alternative example, when an FFT is not implemented, the I/Q imbalance can be filtered out, leaving only the LO feedthrough tone for detection and/or rejection/reduction. At step 432 the method continues by calibrating the LO feedback and finally, at step 434, by calibrating for the I/Q imbalance.

In another specific example of implementation and operation, the Log Amplifier can be configured to provide an average DC out voltage for the LO feed through tone and the I/Q imbalance image as a function of sweeping the low frequency injection tone across a range of frequencies. In an example, the average DC out voltage from the Log Amplifier can be dependent on the filter response "shape". In an example, the average DC out voltage from the Log Amplifier sweeping the low frequency injection tone across a range of frequencies will produce a peak that correlates to the peak of the low pass filter response. In a related example, the low pass filter response can exhibit a different peak position (at a lower or higher peak based on sweep frequency), however the relationship (correlation) of the low pass filter response peak will be substantially maintained once the LO feedthrough and I/Q imbalance are characterized in a given system.

In another specific example of implementation and operation, referring, for example, to FIG. 9A, an LO feed through chain can be characterized and/or calibrated during a test procedure of a transceiver device and/or in a procedure adapted for implementation by a user in the "field", such as anytime the transceiver device is used, or on an otherwise incremental basis.

Figure 10:
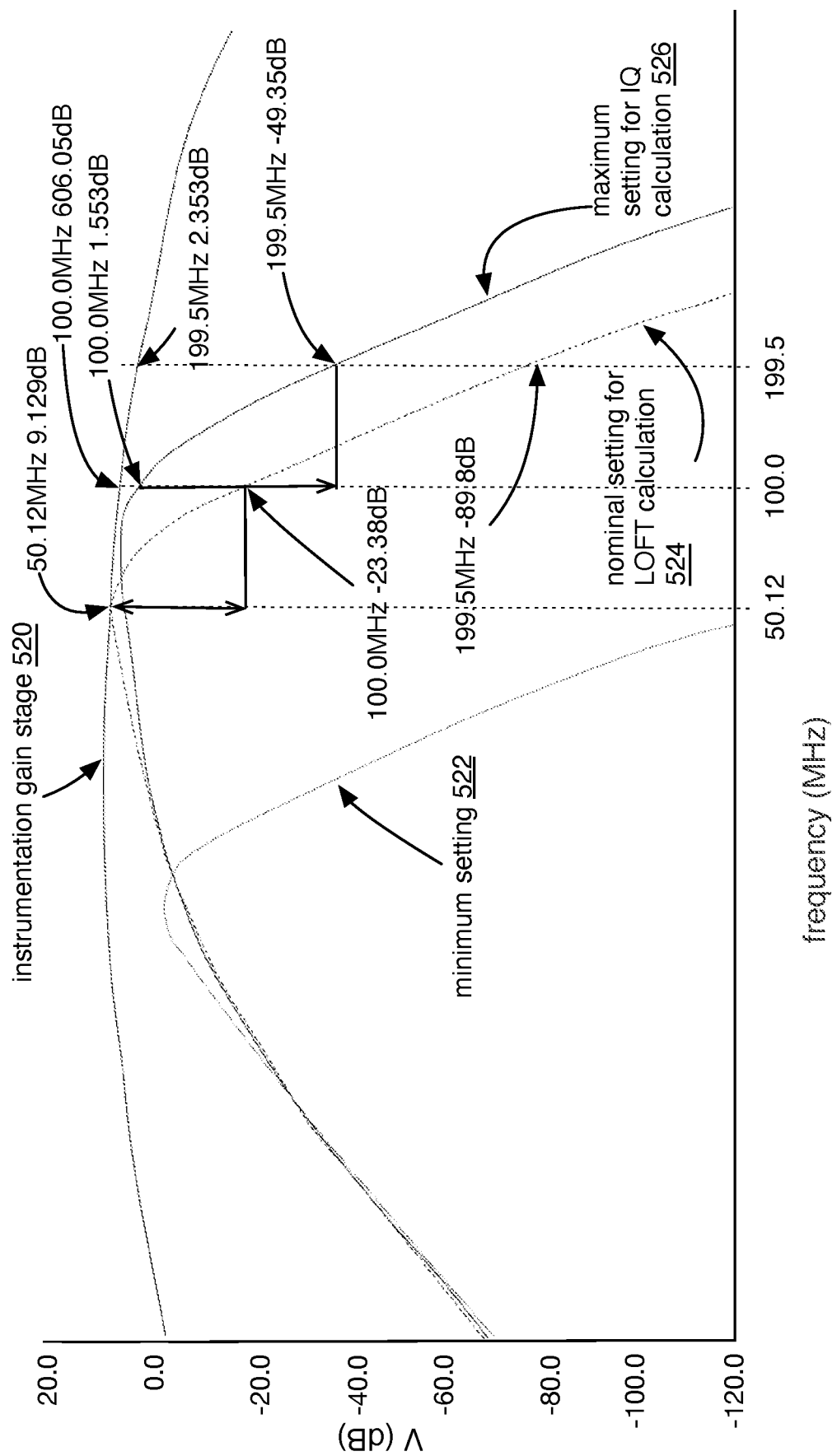
FIG. 10 illustrates the effect of low pass filter frequency on filter response in accordance with the present invention.

FIG. 10 illustrates the effect of low pass filter frequency on filter response. In the example, rejection/reduction of I/Q increases, depending on the particular frequency used for a low frequency injection tone. In an example of implementation, a calibration function can be configured to determine the low frequency injection tone based on a desired filter response. In a related example, when the response of the filter is not known, low frequency injection tone can sweep across a range of frequencies (for example, between minimum setting 522 and maximum setting 526), such that a measured filter response can be used to select an optimum/desired frequency for a low frequency injection tone (for example, nominal setting 524). In a specific example of implementation, by measuring the output from the log amplifier across a range of low frequency injection tone frequencies, a peak average filter response can be determined (i.e. the average filter response from the log amplifier will increase to a peak average and then decrease). Accordingly, in some examples, by sweeping a low frequency injection tone across a range of frequencies, a frequency dependent optimum calibration tone can be determined, thereby eliminating the need for a complex calibrated filter circuit requiring undesirable additional hardware.

FIG. 11 provides a representation of results from using a log amplifier for LO feedthrough amplitude resolution. In an example, as an LO feedthrough tone is progressively attenuated using a calibration function, resolution of an analog to digital converter (ADC) used for the calibration function becomes progressively more difficult. Accordingly, in a further related example, a logarithmic amplifier (log amplifier) can be used to increase the resolution as the LO feedthrough tone approaches zero amplitude. In an example, the log amplifier can be used to convert a DC out voltage to increasingly higher negative value as the LO feedthrough tone approaches zero amplitude, thereby enabling higher ADC resolution for rejection/reduction of the LO feedthrough tone. In the example of FIG. 10, as LO feedthrough tone 308 decreases, log amplifier DC output 306 increases, enabling the calibration function to further attenuate LO feedthrough tone 308.

In some examples of implementation, the quality of rejection of an LO feedthrough tone used in a calibration process can depend on the quality of one or more filters used in the calibration mechanism. For example, if a filter used in the implementation is insufficiently precise, a resultant LO feedthrough tone rejection/reduction will be affected adversely. In an example, if cut-off for a particular filter is at a frequency higher than an associated calibration tone (LOFT), a respective level of IQ tone rejection can be diminished. In another example, if a given filter is at a frequency lower than an associated calibration tone (LOFT), the residue level of a desired LO feedthrough tone selected for detection is reduced and, the resultant calibration result will be at respectively lower precision. Accordingly, in an example, when the frequency response of a select filter can be predetermined, the associated low frequency tone for calibrating LO feedthrough can be better adjusted to increase the efficiency of the associated filter response.

FIG. 12 provides a schematic block diagram of a radio transceiver with a calibration structure. In the example of FIG. 12, transceiver 10 includes transmit (TX) mixer 518 with signals from TX mixer 518 amplified at power amplifier (PA) 502. The output of PA 502 is coupled to the input of envelope detector 516, with the output of envelope detector 516 coupled to the input of envelope amplifier 514. The input of low pass filter 504 is coupled to the output of envelope amplifier 514 and the output of low pass filter 504 is coupled to the input of log amplifier (amp) 512. Log amplifier (AMP) 512 is then coupled at its output to ADC 508, which is configured with a filter/buffer 506.

FIG. 13 is a schematic representation of a calibration architecture incorporating a by-pass circuit. In specific example of implementation and operation, a calibration structure, such as the calibration structure of FIG. 12, can be configured with a bypass circuit 530 to enable a bypass mode for removing the low pass filter from the signal chain to a log amplifier. In an example of implementation and operation, when LO feedthrough can be substantially eliminated, by using one of the mechanisms provided herein, an I/Q imbalance image can present as a single tone, thereby eliminating the need for either a low pass filter and/or an instrumentation gain response structure. In an example, a bypass circuit, such as bypass circuit 530, includes a uses a software switch or a hardware switch to engage or disengage a by-pass mode. In a related example, when an I/Q imbalance image presents as a single tone, a Log Amplifier, such as log AMP 226 referring to FIG. 4, can provide an accurate measurement of the I/Q imbalance and enable calibration to balance I/Q. In an example, I/Q imbalance can be corrected by adjusting the gain of the I or the Q as appropriate to attenuate and/or eliminate the I/Q imbalance image.

In a related example, an envelope detector can be adapted to operate more efficiently when the amplitude of a low frequency injection tone increases. In an example, as a low frequency injection tone increases, the amplitude of any higher order harmonics will also increase. Accordingly, if a low frequency injection tone amplitude is sufficiently high, the I/Q imbalance image in bypass mode can include a second harmonic of the low frequency injection tone. In an example of implementation, a low frequency injection tone can be configured for programmability, so that when the calibration procedure is adapted for bypass mode the low frequency injection tone can be selected at frequency high enough that second (and higher) harmonics of the low frequency injection tone will not be problematic. In an alternative example of implementation and operation, when the calibration procedure is adapted for bypass mode the low frequency injection tone frequency can be divided in half, so that any harmonics are filtered out in the LO feed through process.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for calibrating a radio transceiver, the method comprising:
    injecting a variable frequency tone;
    upconverting the variable frequency tone to generate a plurality of upconverted tones at an input to a lowpass filter of the radio transceiver;
    determining, based on the plurality of tones, a filter response for the lowpass filter;
    determining, based on the filter response, a calibration tone for the lowpass filter.

2. The method of claim 1, wherein the variable frequency tone is a sweeping tone from a minimum frequency to a maximum frequency.

3. The method of claim 2, wherein the sweeping tone repeats between the minimum frequency and the maximum frequency for a period of time V, wherein V is a multiple of a time required for the sweeping tone to traverse between the minimum frequency and the maximum frequency.

4. The method of claim 2, wherein the sweeping tone is a continuously varying frequency between a minimum frequency and a maximum frequency.

5. The method of claim 1, wherein the calibration tone is a tone at which the lowpass filter passes a local oscillator feed-through (LOFT) at a lowpass filter output, while substantially attenuating other upconverted tones.

6. The method of claim 1, further comprising:
    using the calibration tone to substantially remove local oscillator feed-through (LOFT) at the lowpass filter output.

7. The method of claim 4, wherein the local oscillator feed-through (LOFT) is substantially removed by modifying a mixer at an input to the lowpass filter to maximize attenuation of the local oscillator feed-through (LOFT).

8. The method of claim 1, further comprising:
    inputting the filter responses to the input of a Log amplifier to produce an output voltage before determining the calibration tone.

9. The method of claim 1, further comprising:
    dividing the calibration tone frequency by a factor of approximately two;
    determining, based on the another lowpass filter output, at least one of an in phase or a quadrature imbalance;
    adjusting a mixer at an input to the lowpass filter to attenuate the at least one of in phase or a quadrature imbalance.

10. The method of claim 1, wherein the variable frequency tone is injected at an upconverter.

11. A radio transceiver comprising:
    an upconverter (envelope detector) configured to generate a plurality of upconverted tones based on a variable frequency tone;
    a low pass filter (LPF) operably coupled to the upconverter and configured to generate a filter response based on the plurality of upconverted tones;
    a log amplifier operably coupled to the LPF and configured to generate and output an output voltage that is representative of the filter response; and
    an interface adapted to receive the variable frequency tone and a calibration tone generated in response to the output voltage.

12. The radio transceiver of claim 11, wherein the variable frequency tone is at least an order of magnitude lower than an operating frequency of a local oscillator coupled to a transmit power amplifier input.

13. The radio transceiver of claim 11, wherein the variable frequency tone is a sweeping tone, wherein the sweeping tone varies between a minimum frequency and a maximum frequency.

14. The radio transceiver of claim 13, wherein the sweeping tone repeats between the minimum frequency and the maximum frequency for a period of time V, wherein V is a multiple of a time required for the sweeping tone to traverse between the minimum frequency and the maximum frequency.

15. The radio transceiver of claim 13, wherein the sweeping tone is a continuously varying frequency between a minimum frequency and a maximum frequency.

16. The radio transceiver of claim 11, wherein the calibration tone is a tone at which the lowpass filter passes a local oscillator feed-through (LOFT) at a lowpass filter output, while substantially attenuating other upconverted tones.

17. The radio transceiver of claim 11, wherein the calibration tone is adapted for substantially removing local oscillator feed-through (LOFT) at the lowpass filter output.

18. The radio transceiver of claim 17, wherein the local oscillator feed-through (LOFT) is substantially removed by modifying a mixer at an input to the lowpass filter to maximize attenuation of the local oscillator feed-through (LOFT).

19. The radio transceiver of claim 17, further comprising:
a mixer coupled to an input to the low pass filter, wherein a frequency for the calibration tone frequency is divided by a factor of approximately two; and
adjusting a mixer at an input to the lowpass filter to substantially correct at least one of an in-phase or a quadrature imbalance.

20. The radio transceiver of claim 11, wherein the upconverter includes an envelope detector.

* * * * *